United States Patent
Wei

(10) Patent No.: US 11,802,565 B2
(45) Date of Patent: Oct. 31, 2023

(54) ELECTRIC WATER PUMP WITH CONTROL PANEL MOUNTED IN THE MIDDLE OF THE WATER PUMP

(71) Applicant: GUANGDONG JUNCHI SCIENCE AND TECHNOLOGY CO., LTD., Zhaoqing (CN)

(72) Inventor: Xiuxia Wei, Zhaoqing (CN)

(73) Assignee: GUANGDONG JUNCHI SCIENCE AND TECHNOLOGY CO., LTD., Guangdong (CN)

( * ) Notice: Subject to any disclaimer, the term of this patent is extended or adjusted under 35 U.S.C. 154(b) by 439 days.

(21) Appl. No.: 17/274,941

(22) PCT Filed: Oct. 29, 2020

(86) PCT No.: PCT/CN2020/124961
§ 371 (c)(1),
(2) Date: Mar. 10, 2021

(87) PCT Pub. No.: WO2021/196579
PCT Pub. Date: Oct. 7, 2021

(65) Prior Publication Data
US 2022/0112871 A1 Apr. 14, 2022

(30) Foreign Application Priority Data
Apr. 1, 2020 (CN) .......................... 202010248892.2

(51) Int. Cl.
*F04D 29/42* (2006.01)
*F04D 13/06* (2006.01)
(Continued)

(52) U.S. Cl.
CPC ....... *F04D 29/426* (2013.01); *F04D 13/0606* (2013.01); *F04D 13/0686* (2013.01);
(Continued)

(58) Field of Classification Search
CPC ............. F04D 13/0606; F04D 13/0633; F04D 13/0686; F04D 29/426; F04D 29/043;
(Continued)

(56) References Cited

U.S. PATENT DOCUMENTS 10,161,415 B2    12/2018   Honda
10,323,654 B2 *   6/2019   Zhang ................. F04D 13/0646
11,095,191 B2 *   8/2021   Wrighton ................. H02K 9/19

FOREIGN PATENT DOCUMENTS

CN    204941981 U    1/2016
CN    110566516 A   12/2019
(Continued)

OTHER PUBLICATIONS

International Search Report from PCT/CN2020/124961, dated Jan. 27, 2021 (5 pages).
(Continued)

*Primary Examiner* — Kenneth J Hansen
(74) *Attorney, Agent, or Firm* — Ware, Fressola, Maguire & Barber LLP

(57) ABSTRACT

An electric water pump with a control panel mounted in the middle of the water pump is disclosed, including a water pump volute casing, a water pump impeller, a pump cover, a water pump control panel, a rotor, a rotor cover, a housing, a rear bearing, a stator, a thrust ring, and a front bearing. The water pump volute casing is mounted on a surface at a front end of the pump cover. The water pump control panel is mounted on a surface at a rear end of the pump cover. An end opening of the rotor cover is sleeved on an outer circumference of a boss at the rear end of the pump cover.

10 Claims, 2 Drawing Sheets

(51) Int. Cl.
　　　*F04D 29/58*　　　(2006.01)
　　　*F04D 29/00*　　　(2006.01)
　　　*F04D 29/046*　　(2006.01)
　　　*H02K 11/33*　　　(2016.01)
　　　*H02K 5/12*　　　 (2006.01)

(52) U.S. Cl.
　　　CPC ......... *F04D 29/007* (2013.01); *F04D 29/046* (2013.01); *F04D 29/5813* (2013.01); *F04D 29/5893* (2013.01); *H02K 5/12* (2013.01); *H02K 11/33* (2016.01)

(58) Field of Classification Search
　　　CPC .. F04D 29/046; F04D 29/007; F04D 29/5813; F04D 29/5893; H02K 1/32; H02K 5/12; H02K 2201/03
　　　See application file for complete search history.

(56) References Cited

FOREIGN PATENT DOCUMENTS

| | | | |
|---|---|---|---|
| CN | 210050054 U | 2/2020 | |
| CN | 210178587 U | 3/2020 | |
| CN | 111271295 A | 6/2020 | |
| CN | 212155186 U | 12/2020 | |
| EP | 1239152 A2 * | 9/2002 | ............. F04B 17/03 |
| EP | 1335135 B1 | 6/2005 | |
| EP | 2199617 A2 * | 6/2010 | ........... F04D 13/026 |

OTHER PUBLICATIONS

Written Opinion from PCT/CN2020/124961, dated Jan. 22, 2021 (7 pages).

\* cited by examiner

ELECTRIC WATER PUMP WITH CONTROL PANEL MOUNTED IN THE MIDDLE OF THE WATER PUMP

CROSS-REFERENCE TO RELATED APPLICATIONS

This application is a national stage filing under 35 U.S.C. § 371 of international application number PCT/CN2020/124961 filed Oct. 29, 2020, which claims priority to Chinese patent application No. 202010248892.2 filed Apr. 1, 2020. The contents of these applications are incorporated herein by reference in their entirety.

TECHNICAL FIELD

The present disclosure relates to an electric water pump, and in particular, to an electric water pump with a control panel mounted in the middle of the water pump, which is applied to an automotive cooling system.

BACKGROUND

With the development of electric vehicles, power members such as a drive motor and a power battery of an electric vehicle all require cooling by a cooling system to ensure their operation performance and reliability. A mechanical water pump driven by an engine of a conventional fuel vehicle is absent in the cooling system of the electric vehicle, so that only an electric water pump driven by electric power can be used. A motor and a motor control panel for driving the motor to operate generate heat during operation. Overheating caused by a magnetic eddy current in a rotor may lead to degaussing of a permanent magnet in the rotor. Overheating in a stator may lead to burnout of the insulation of a coil. Overheating in the control panel may lead to burnout of devices in the control panel. In an existing electric water pump, the control panel is mounted at a rear end of the water pump, and immersive cooling without the circulation of internal cooling water is used for internal cooling. Internal heat cannot be adequately dissipated, and the control panel, the rotor, and the stator are inadequately cooled. The electric water pump is prone to potential hazard of overheating damage. In another aspect, torsional vibration occurs in a motor rotor of a drive motor under the drive of an alternating magnetic field force. Torsional vibration occurs in a water pump impeller during the pumping of water. Air in an inner cavity of the electric water pump is heated and cooled to generate thermal expansion and contraction effects, leading to a change in the air pressure in the inner cavity of the electric water pump. With a pressure difference between the inside and outside of the electric water pump, structural members in the electric water pump are subject to additional stress, which affects the reliability of the electric water pump.

SUMMARY

In view of the deficiencies in the prior art, the present disclosure provides an electric water pump with a control panel mounted in the middle of the water pump, which adequately cools a control panel, a rotor, and a stator and has a low thermal load.

The present disclosure adopts the following technical solution. An electric water pump with a control panel mounted in the middle of the water pump includes: a water pump volute casing, a water pump impeller, a pump cover, a water pump control panel, a rotor, a rotor cover, a housing, a rear bearing, a stator, a thrust ring, and a front bearing. The water pump volute casing is mounted on a surface at a front end of the pump cover, an annular boss is disposed on the surface at the front end of the pump cover, an indent is provided at a central position of the annular boss at the front end of the pump cover, a front bearing mounting hole penetrating the surface at the front end and a surface at a rear end of the pump cover is provided in the indent at the front end of the pump cover. An overflow hole is provided above the front bearing mounting hole of the pump cover, the water pump control panel is mounted on the surface at the rear end of the pump cover. A boss is disposed at a central position of the surface at the rear end of the pump cover, an end opening of the rotor cover is sleeved on an outer circumference of the boss at the rear end of the pump cover, an indent is provided at a rear end of an inner cavity of the rotor cover, a plurality of bosses are provided on a bottom surface of the indent at the rear end of the inner cavity of the rotor cover. The rear bearing is mounted in the indent at the rear end of the inner cavity of the rotor cover, an overflow groove is provided in a bearing hole of the rear bearing, the front bearing is mounted in the front bearing mounting hole in the pump cover, an overflow groove is provided in a bearing hole of the front bearing. The rotor is mounted in the inner cavity of the rotor cover, a rotor vane is disposed on a surface at a rear end of the rotor, a spiral protrusion is disposed at an outer circumference of the rotor, a boss is disposed on a surface at a front end of the rotor, a convex tooth is disposed on the exterior of the boss at the front end of the rotor, an overflow groove is provided in the boss at the front end of the rotor, a through hole penetrating the front end and the rear end is provided at the axis of the rotor, a plurality of radial through holes penetrating the axial through hole are provided in an axial surface of a front portion of the rotor, a plurality of overflow holes penetrating the surface at the front end and the surface at the rear end of the rotor are provided in the rotor. A through hole is provided at the axis of the thrust ring, the axial through hole of the thrust ring is sleeved on an outer circumference of the boss at the front end of the rotor. The water pump impeller is provided at an outer circumference of a front end of the axis of the rotor, an axial section of the front end of the rotor is supported in the bearing hole of the front bearing, an axial section of the rear end of the rotor is supported in the bearing hole of the rear bearing. The stator is sleeved on an outer circumference of the rotor cover, a protrusion is provided on an outer circumference of the stator, and an inner cavity of the housing is sleeved on the outer circumference of the stator.

Preferably, a vent hole communicating the inner cavity of the housing with outside is provided in a surface at a rear end of the housing, a boss is disposed at the bottom of the inner cavity of the housing, an indent is provided inside the boss at the bottom of the inner cavity at the rear end of the housing, a ventilator is mounted in the indent inside the boss at the bottom of the inner cavity at the rear end of the housing, and a ventilation membrane capable of blocking liquid and allowing the passage of gas is provided on the ventilator.

Preferably, a capacitor mounting boss is disposed on the surface at a rear end of a head portion of the housing, a cavity is provided inside the capacitor mounting boss of the housing, and the cavity inside the capacitor mounting boss of the housing is sleeved on a drive capacitor on the water pump control panel.

Preferably, a boss is disposed on a surface at a lower end of a foot of the housing, and a foot vibration absorbing pad is sleeved on the boss at the lower end of the foot of the housing.

Preferably, an axial concave groove is provided in a hole wall of the inner cavity of the housing, and the protrusion on the outer circumference of the stator is sheathed in the axial concave groove in the hole wall of the inner cavity of the housing.

Preferably, a rear bearing vibration absorbing ring is provided in a gap between the indent at the rear end of the inner cavity of the rotor cover and an outer circumference of the rear bearing, and a front bearing vibration absorbing ring is provided in a gap between the front bearing mounting hole in the pump cover and the outer circumference.

Preferably, a plug is disposed at a front end of the axial through hole of the rotor.

Preferably, the bosses on the bottom surface at the rear end of the inner cavity of the rotor cover are held against a rotor-axis surface at the rear end of the rotor, a clamping groove is provided at an edge of the axial through hole of the thrust ring, a concave groove is provided in a surface at a front end of the thrust ring, the axial through hole of the thrust ring is sleeved on the outer circumference of the boss at the front end of the rotor, a surface at a rear end of the thrust ring abuts against a surface at a front end of a reinforcing rib at a periphery of the boss at the front end of the rotor, the surface at the front end of the thrust ring abuts against a surface at a rear end of the front bearing, and the convex tooth on the exterior of the boss at the front end of the rotor is sheathed in the clamping groove at the edge of the axial through hole of the thrust ring.

Preferably, a power socket is mounted on a surface at a rear end of an upper portion of the housing, and a surface at a front end of the housing is tightly pressed on a housing seal ring under the action of a tightening force of a connecting screw.

Preferably, a plurality of protruding reinforcing ribs are disposed inside the annular boss at the front end of the pump cover.

The beneficial effects of the electric water pump with a control panel mounted in the middle of the water pump provided in the present disclosure are as follows:

1) The electric water pump has an adequate internal cooling system. During actual cooling, a part of water behind the water pump impeller passes through the radial through holes in the axial surface of a front portion of the rotor to directly enter the axial through hole of the rotor. Another part of water behind the water pump impeller flows through the overflow groove in the bearing hole of the front bearing, the axial through hole of the thrust ring, and the overflow groove inside the boss at the front end of the rotor, and then flows through the radial through holes in the axial surface of the front portion of the rotor to enter the axial through hole of the rotor to form an internal cooling water flow. The internal cooling water flow flows backward through the indent at the rear end of the inner cavity of the rotor cover and the overflow groove in the bearing hole of the rear bearing to enter the rear end of the rotor, and is then pumped by the rotor vane on the surface at the rear end of the rotor to a region of an outer circumference of the rear portion of the rotor. A part of the internal cooling water flow in the region of the outer circumference of the rear portion of the rotor flows to the front end of the rotor along the internal overflow holes of the rotor. Another part of the internal cooling water in the region of the outer circumference of the rear portion of the rotor is pushed by the spiral protrusion on the outer circumference of the rotor to flow to the front end of the rotor along a gap between the outer circumference of the rotor and a wall surface of the inner cavity of the rotor cover. The internal cooling water at the front end of the rotor flows through the overflow hole in the pump cover and flows from the water cavity at the front portion of the pump cover to enter a water outlet of the water pump volute casing for discharge. The electric water pump has a low thermal load during actual operation, and can adequately cool a control panel, a rotor, and a stator.

2) In the electric water pump, the water pump control panel is mounted on the surface at the rear end of the pump cover in the middle of the water pump. The water pump control panel is directly cooled by a water flow inside the water pump volute casing through the pump cover, to implement the high reliability of the water pump control panel. In terms of a frictional load, the water pressure behind the water pump impeller is higher than the water pressure in front of the water pump impeller when the rotor drives the water pump impeller to rotate, so that a forward axial pushing force is generated on the water pump impeller. The forward axial pushing force on the water pump impeller is transferred through the rotor and the thrust ring and is applied by the surface at the front end of the thrust ring to the surface at the rear end of the front bearing. The spiral protrusion on the outer circumference of the rotor pushes internal cooling water to the front end of the rotor, and a counterforce resulting therefrom generates a backward axial pushing force on the rotor, so that the forward axial pushing force applied to the rotor is suppressed, and the pressure applied by the surface at the front end of the thrust ring to the surface at the rear end of the front bearing is reduced. Water in the concave groove in the surface at the front end of the thrust ring is distributed on the surface at the rear end of the front bearing during the rotation of the thrust ring, which further reduces the friction between the surface at the front end of the thrust ring and the surface at the rear end of the front bearing, and therefore the operating reliability of the electric water pump is improved.

3) In the electric water pump, the ventilator is provided with the ventilation membrane capable of blocking liquid and allowing the passage of gas. When the internal air pressure of the electric water pump is greater than the external air pressure, the gas inside the electric water pump is breathed out through the ventilator and the vent hole in the surface at the rear end of the housing. When the internal air pressure of the electric water pump is less than the external air pressure, the gas outside the electric water pump is breathed in through the vent hole in the surface at the rear end of the housing and the ventilator to implement a pressure balance between the interior and exterior of the electric water pump. Thus, additional stresses caused by a pressure difference due to the thermal expansion and contraction of gas in an inner cavity of the electric water pump are suppressed.

DETAILED DESCRIPTION

For the orientations "front" and "rear" in this specification, a side close to a water pump volute casing is the front, and a side close to a controller cover of the water pump is the rear, which are the same hereinafter.

Figure 1:
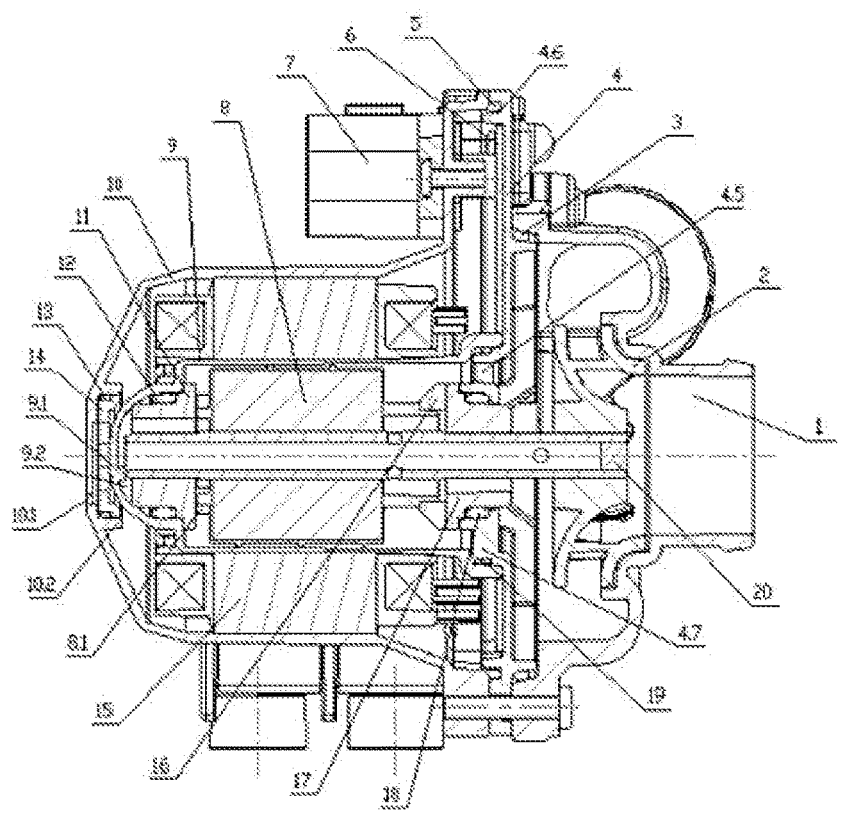
FIG. 1 is a structural sectional view of an electric water pump according to the present disclosure.
Figure 2:
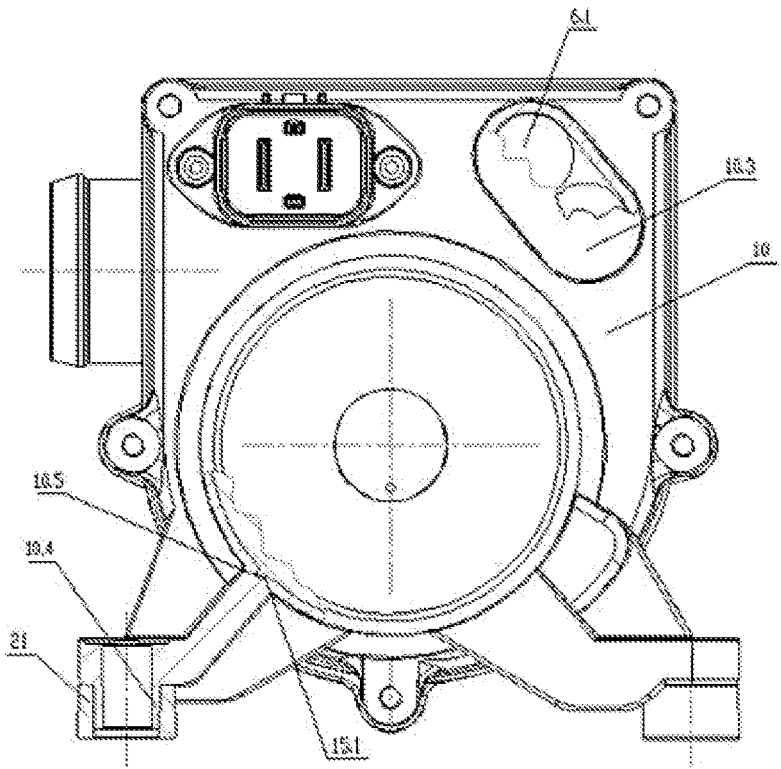
FIG. 2 is a rear view of an electric water pump according to the present disclosure.
Figure 3:
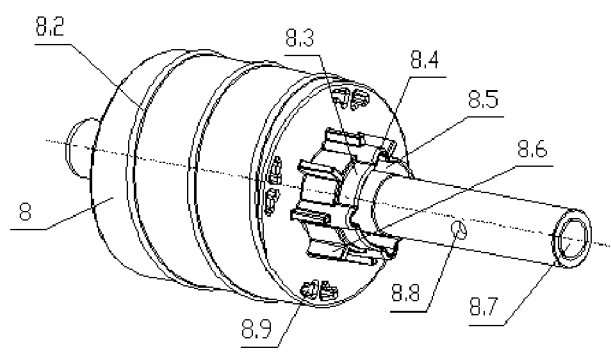
FIG. 3 is a view of a rotor according to the present disclosure.
Figure 4:
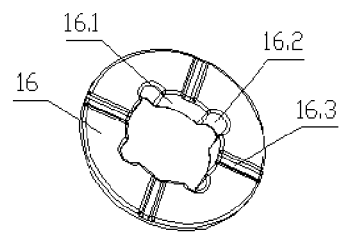
FIG. 4 is a view of a thrust ring according to the present disclosure.
Figure 5:
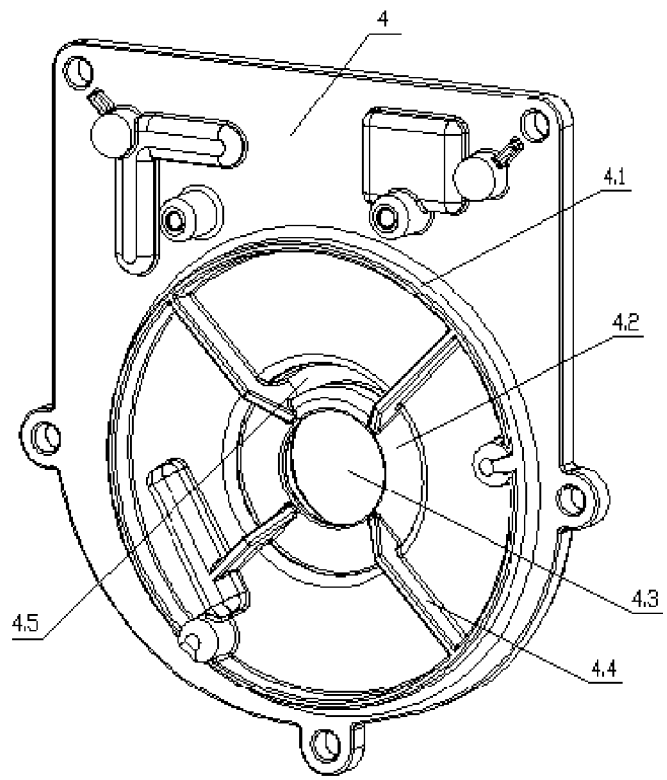
FIG. 5 is a front view of a pump cover according to the present disclosure.

The implementations of the present disclosure are further described below with reference to the accompanying drawings:

Referring to FIG. 1 to FIG. 5, an electric water pump with a control panel mounted in the middle of the water pump includes a water pump volute casing 1, a water pump impeller 2, a volute casing seal ring 3, a pump cover 4, a housing seal ring 5, a water pump control panel 6, a power socket 7, a rotor 8, a rotor cover 9, a housing 10, a rear bearing 11, a rear bearing vibration absorbing ring 12, a ventilator seal ring 13, a ventilator 14, a stator 15, a thrust ring 16, a front bearing 17, a front bearing vibration absorbing ring 18, a rotor cover seal ring 19, a plug 20, and a foot vibration absorbing pad 21. The water pump volute casing 1 is mounted on a surface at a front end of the pump cover 4. An annular boss 4.1 is disposed on the surface at the front end of the pump cover 4. An indent 4.2 is provided at a central position of the annular boss 4.1 at the front end of the pump cover 4. A front bearing mounting hole 4.3 penetrating the surface at the front end and a surface at a rear end of the pump cover 4 is provided in the indent 4.2 at the front end of the pump cover 4. A plurality of protruding reinforcing ribs 4.4 are disposed inside the annular boss 4.1 at the front end of the pump cover 4.

An overflow hole 4.5 is provided above the front bearing mounting hole 4.3 of the pump cover 4. The volute casing seal ring 3 is disposed in a gap between an outer circumference of the annular boss 4.1 at the front end of the pump cover 4 and an end opening of the water pump volute casing 1. A seal ring mount groove 4.6 is provided at an outer edge of the surface at the rear end of the pump cover 4. The housing seal ring 5 is mounted in the seal ring mount groove 4.6 at the outer edge of the surface at the rear end of the pump cover 4.

The water pump control panel 6 is mounted on the surface at the rear end of the pump cover 4. A vertically mounted drive capacitor 6.1 is disposed on the water pump control panel 6. A boss 4.7 is disposed at a central position of the surface at the rear end of the pump cover 4. An end opening of the rotor cover 9 is sleeved on an outer circumference of the boss 4.7 at the rear end of the pump cover 4. The rotor cover seal ring 19 is disposed in a gap between the outer circumference of the boss 4.7 at the rear end of the pump cover 4 and the end opening of the rotor cover 9. An indent 9.2 is provided at a rear end of an inner cavity of the rotor cover 9. A plurality of bosses 9.1 are provided on a bottom surface of the indent 9.2 at the rear end of the inner cavity of the rotor cover 9.

The rear bearing 11 is mounted in the indent 9.2 at the rear end of the inner cavity of the rotor cover 9. An overflow groove is provided in a bearing hole of the rear bearing 11. A rear bearing vibration absorbing ring 12 is disposed in a gap between the indent 9.2 at the rear end of the inner cavity of the rotor cover 9 and an outer circumference of the rear bearing 11. The front bearing 17 is mounted in the front bearing mounting hole 4.3 in the pump cover 4. An overflow groove is provided in a bearing hole of the front bearing 17. The front bearing vibration absorbing ring 18 is disposed in a gap between the front bearing mounting hole 4.3 in the pump cover 4 and an outer circumference of the front bearing 17. The front bearing vibration absorbing ring 18 and the rear bearing vibration absorbing ring 12 together inhibit the transfer of the vibration of the rotor 8 to the outside.

The rotor 8 is mounted in the inner cavity of the rotor cover 9. A rotor vane 8.1 is disposed on a surface at a rear end of the rotor 8. A spiral protrusion 8.2 is disposed at an outer circumference of the rotor 8. A boss 8.3 is disposed on a surface at a front end of the rotor 8. A convex tooth 8.4 is disposed on the exterior of the boss 8.3 at the front end of the rotor 8. An overflow groove 8.5 is provided in the boss 8.3 at the front end of the rotor 8. A reinforcing rib 8.6 is disposed at a periphery of the boss 8.3 at the front end of the rotor 8. A through hole 8.7 penetrating the front end and the rear end is provided at the axis of the rotor 8. A plurality of radial through holes 8.8 penetrating the axial through hole 8.7 are provided in an axial surface of a front portion of the rotor 8. A plurality of overflow holes 8.9 penetrating the surface at the front end and the surface at the rear end of the rotor 8 are provided in the rotor 8. The plug 20 is disposed at a front end of the axial through hole 8.7 of the rotor 8 to prevent internal cooling water from flowing back to a water absorption region in front of the water pump impeller 2.

The water pump impeller 2 is provided at the outer circumference of the front end at the axis of the rotor 8. An axial section of the front end of the rotor 8 is supported in the bearing hole of the front bearing 17. An axial section of the rear end of the rotor 8 is supported in the bearing hole of the rear bearing 11. The bosses 9.1 on the bottom surface at the rear end of the inner cavity of the rotor cover 9 are held against a rotor-axis surface at the rear end of the rotor 8 to restrict a backward movement of the rotor 8.

A through hole 16.1 is provided at the axis of the thrust ring 16. A clamping groove 16.2 is provided at an edge of the axial through hole 16.1 of the thrust ring 16. A concave groove 16.3 is provided in a surface at a front end of the thrust ring 16. The axial through hole 16.1 of the thrust ring 16 is sleeved on an outer circumference of the boss 8.3 at the front end of the rotor 8. A surface at a rear end of the thrust ring 16 abuts against a surface at a front end of the reinforcing rib 8.6 at a periphery of the boss 8.3 at the front end of the rotor 8. The surface at the front end of the thrust ring 16 abuts against a surface at a rear end of the front bearing 17 to restrict a forward movement of the rotor 8. The convex tooth 8.4 on the exterior of the boss 8.3 at the front end of the rotor 8 is sheathed in the clamping groove 16.2 at the edge of the axial through hole 16.1 of the thrust ring 16 to drive the thrust ring 16 to synchronously rotate along with the rotor 8.

The stator 15 is sleeved on an outer circumference of the rotor cover 9. A protrusion 15.1 is provided on an outer circumference of the stator 15. An inner cavity of the housing 10 is sleeved on the outer circumference of the stator 15. The power socket 7 is mounted on a surface at a rear end of an upper portion of the housing 10. A surface at a front end of the housing 10 is tightly pressed on the housing seal ring 5 under the action of a tightening force of a connecting screw. A vent hole 10.1 communicating the inner cavity of the housing 10 with outside is provided in a surface at a rear end of the housing 10. A boss 10.2 is disposed at the bottom of the inner cavity of the housing 10. An indent is provided inside the boss 10.2 at the bottom of the inner cavity at the rear end of the housing 10.

The ventilator 14 is mounted in the indent inside the boss 10.2 at the bottom of the inner cavity at the rear end of the housing 10. The ventilator seal ring 13 is disposed in a gap between the indent inside the boss 10.2 at the inner cavity at the bottom of the rear end of the housing 10 and an outer circumference of the ventilator 14. A capacitor mounting boss 10.3 is disposed on the surface at the rear end of the head portion of the housing 10. A cavity is provided inside the capacitor mounting boss 10.3 of the housing 10. The cavity inside the capacitor mounting boss 10.3 of the housing 10 is sleeved on the drive capacitor 6.1 on the water pump control panel 6. A boss 10.4 is disposed on a surface at a lower end of a foot of the housing 10. The foot vibration absorbing pad 21 is sleeved on the boss 10.4 at the lower end of the foot of the housing 10.

An axial concave groove 10.5 is provided in a hole wall of the inner cavity of the housing 10. The protrusion 15.1 on the outer circumference of the stator 15 is sheathed in the axial concave groove 10.5 in the hole wall of the inner cavity of the housing 10 to inhibit torsional vibration of the stator 15.

The ventilator 14 is provided with a ventilation membrane capable of blocking liquid and allowing the passage of gas. When the internal air pressure of the electric water pump is greater than the external air pressure, the gas inside the electric water pump is breathed out through the ventilator 14 and the vent hole 10.1 in the surface at the rear end of the housing 10. When the internal air pressure of the electric water pump is less than the external air pressure, the gas outside the electric water pump is breathed in through the vent hole 10.1 in the surface at the rear end of the housing 10 and the ventilator 14 to implement a pressure balance between the interior and exterior of the electric water pump, to inhibit additional stresses caused by a pressure difference due to the thermal expansion and contraction of gas in an inner cavity of the electric water pump.

In terms of internal cooling, a part of water behind the water pump impeller 2 passes through the radial through holes 8.8 in the axial surface of the front portion of the rotor 8 to directly enter the axial through hole 8.7 of the rotor 8, and another part of water behind the water pump impeller 2 flows through the overflow groove in the bearing hole of the front bearing 17, the axial through hole 16.1 of the thrust ring 16, and the overflow groove 8.5 inside the boss 8.3 at the front end of the rotor 8, and then flows through the radial through holes 8.8 in the axial surface of a front portion of the rotor 8 to enter the axial through hole 8.7 of the rotor 8 to form an internal cooling water flow. The internal cooling water flow flows backward through the indent 9.2 along the axial through hole 8.7 of the rotor 8 at the rear end of the inner cavity of the rotor cover 9 and the overflow groove in the bearing hole of the rear bearing 11 to enter the rear end of the rotor, and is then pumped by the rotor vane 8.1 on the surface at the rear end of the rotor 8 to a region of an outer circumference of the rear portion of the rotor 8. A part of the internal cooling water flow in the region of the outer circumference of the rear portion of the rotor 8 flows to the front end of the rotor 8 along the internal overflow holes 8.9 of the rotor 8. Another part of the internal cooling water in the region of the outer circumference of the rear portion of the rotor 8 is pushed by the spiral protrusion 8.2 on the outer circumference of the rotor 8 to flow to the front end of the rotor 8 along a gap between the outer circumference of the rotor 8 and a wall surface of the inner cavity of the rotor cover 9. The internal cooling water at the front end of the rotor 8 flows through the overflow hole 4.5 in the pump cover 4 and flows from the water cavity at the front portion of the pump cover 4 to enter a water outlet of the water pump volute casing 1 for discharge to form an internal cooling system. In addition, the water pump control panel 6 is mounted on the surface at the rear end of the pump cover 4 in the middle of the water pump. The water pump control panel 6 is directly cooled by a water flow inside the water pump volute casing 1 through the pump cover 4, to implement the high reliability of the water pump control panel 6.

In terms of a frictional load, the water pressure behind the water pump impeller 2 is higher than the water pressure in front of the water pump impeller 2 when the rotor 8 drives the water pump impeller 2 to rotate, so that a forward axial pushing force is generated on the water pump impeller 2. The forward axial pushing force on the water pump impeller 2 is transferred through the rotor 8 and the thrust ring 16 and is applied by the surface at the front end of the thrust ring 16 to the surface at the rear end of the front bearing 17. The spiral protrusion 8.2 on the outer circumference of the rotor 8 pushes internal cooling water to the front end of the rotor 8, and a counterforce resulting therefrom generates a backward axial pushing force on the rotor 8, so that the forward axial pushing force applied to the rotor 8 is suppressed, and the pressure applied by the surface at the front end of the thrust ring 16 to the surface at the rear end of the front bearing 17 is reduced. Water in the concave groove 16.3 in the surface at the front end of the thrust ring 16 is distributed on the surface at the rear end of the front bearing 17 during the rotation of the thrust ring 16, which further reduces the friction between the surface at the front end of the thrust ring 16 and the surface at the rear end of the front bearing 17, and therefore the operating reliability of the electric water pump is improved.

The above is merely a preferred embodiment of the present disclosure. However, the present disclosure shall not be limited to the content disclosed in the embodiment and the accompanying drawings. Therefore, equivalents or modifications completed without departing from the gist disclosed in the present disclosure shall all fall within the protection scope of the present disclosure.

The invention claimed is:

1. An electric water pump with a water pump control panel mounted in the electric water pump, comprising: a water pump volute casing, a water pump impeller, a pump cover, a rotor, a rotor cover, a housing, a rear bearing, a stator, a thrust ring, and a front bearing, wherein, the water pump volute casing is mounted on a surface at a front end of the pump cover, an annular boss is disposed on the surface at the front end of the pump cover, an indent is provided at a central position of the annular boss at the front end of the pump cover, a front bearing mounting hole penetrating the surface at the front end and a surface at a rear end of the pump cover is provided in the indent at the front end of the pump cover, an overflow hole is provided above the front bearing mounting hole of the pump cover, the water pump control panel is mounted on the surface at the rear end of the pump cover, a boss is disposed at a central position of the surface at the rear end of the pump cover, an end opening of the rotor cover is sleeved on an outer circumference of the boss at the rear end of the pump cover, an indent is provided at a rear end of an inner cavity of the rotor cover, a plurality of bosses are provided on a bottom surface of the indent at the rear end of the inner cavity of the rotor cover, the rear bearing is mounted in the indent at the rear end of the inner cavity of the rotor cover, an overflow groove is provided in a bearing hole of the rear bearing, the front bearing is mounted in the front bearing mounting hole in the pump cover, an overflow groove is provided in a bearing hole of the front bearing, the rotor is mounted in the inner cavity of the rotor cover, a rotor vane is disposed on a surface at a rear end of the rotor, a spiral protrusion is disposed at an outer circumference of the rotor, a boss is disposed on a surface at a front end of the rotor, a convex tooth is disposed on an exterior of the boss at the front end of the rotor, an overflow groove is provided in the boss at the front end of the rotor, an axial through hole penetrating the front end and the rear end is provided at an axis of the rotor, a plurality of radial through holes penetrating the axial through hole are provided in an axial surface of a front portion of the rotor, a plurality of overflow holes penetrating the surface at the front end and the surface at the rear end of the rotor are provided in the rotor, an axial through hole is provided at an axis of the thrust ring, the axial through hole of the thrust ring is sleeved on an outer circumference of the boss at the front end of the rotor, the water pump impeller is provided at an outer circumference of a front end of the axis of the rotor, an axial section of the front end of the rotor is supported in the bearing hole of the front bearing, an axial section of the rear end of the rotor is supported in the bearing hole of the rear bearing, and the stator is sleeved on an outer circumference of the rotor cover, a protrusion is provided on an outer circumference of the stator, and an inner cavity of the housing is sleeved on the outer circumference of the stator.

2. The electric water pump of claim 1, wherein a vent hole communicating the inner cavity of the housing with outside is provided in a surface at a rear end of the housing, a boss is disposed at the bottom of the inner cavity of the housing, an indent is provided inside the boss at the bottom of the inner cavity at the rear end of the housing, a ventilator is mounted in the indent inside the boss at the bottom of the inner cavity at the rear end of the housing, and a ventilation membrane capable of blocking liquid and allowing passage of gas is provided on the ventilator.

3. The electric water pump of claim 2, wherein a capacitor mounting boss is disposed on a surface at a rear end of a head portion of the housing, a cavity is provided inside the capacitor mounting boss of the housing, and the cavity inside the capacitor mounting boss of the housing is sleeved on a drive capacitor on the water pump control panel.

4. The electric water pump of claim 1, wherein a boss is disposed on a surface at a lower end of a foot of the housing, and a foot vibration absorbing pad is sleeved on the boss at the lower end of the foot of the housing.

5. The electric water pump of claim 1, wherein an axial concave groove is provided in a hole wall of the inner cavity of the housing, and the protrusion on the outer circumference of the stator is sheathed in the axial concave groove in the hole wall of the inner cavity of the housing.

6. The electric water pump of claim 1, wherein a rear bearing vibration absorbing ring is provided in a gap between the indent at the rear end of the inner cavity of the rotor cover and an outer circumference of the rear bearing, and a front bearing vibration absorbing ring is provided in a gap between the front bearing mounting hole in the pump cover and an outer circumference of the front bearing.

7. The electric water pump of claim 1, wherein a plug is disposed at a front end of the axial through hole of the rotor.

8. The electric water pump of claim 1, wherein the plurality of bosses on the bottom surface of the indent at the rear end of the inner cavity of the rotor cover are held against a rotor-axis surface at the rear end of the rotor, a clamping groove is provided at an edge of the axial through hole of the thrust ring, a concave groove is provided in a surface at a front end of the thrust ring, the axial through hole of the thrust ring is sleeved on the outer circumference of the boss at the front end of the rotor, a surface at a rear end of the thrust ring abuts against a surface at a front end of a reinforcing rib at a periphery of the boss at the front end of the rotor, the surface at the front end of the thrust ring abuts against a surface at a rear end of the front bearing, and the convex tooth on the exterior of the boss at the front end of the rotor is sheathed in the clamping groove at the edge of the axial through hole of the thrust ring.

9. The electric water pump of claim 1, wherein a power socket is mounted on a surface at a rear end of an upper portion of the housing, and a surface at a front end of the housing is tightly pressed on a housing seal ring under action of a tightening force of a connecting screw.

10. The electric water pump of claim 1, wherein a plurality of protruding reinforcing ribs are disposed inside the annular boss at the front end of the pump cover.

* * * * *